United States Patent [19]
Gleockler et al.

[11] 3,953,001
[45] Apr. 27, 1976

[54] MIXING AND DISPENSING APPARATUS FOR POISON SPRAY

[76] Inventors: Frederick M. Gleockler; Robert G. Gleockler, both of R.D. No. 1, Ridgely, Md. 21660

[22] Filed: June 11, 1974

[21] Appl. No.: 478,225

[52] U.S. Cl. .............................. 259/4 R; 137/592
[51] Int. Cl.² .......................................... B01F 5/10
[58] Field of Search .............. 259/4, 95, 96, 18, 36, 259/2, DIG. 17, 97, 98, 182; 239/545, 567; 137/592, 584, 585

[56] References Cited
UNITED STATES PATENTS

| | | | |
|---|---|---|---|
| 3,055,378 | 9/1962 | Alford | 137/592 |
| 3,376,022 | 4/1968 | Gleockler | 259/2 |
| 3,425,669 | 2/1969 | Gaddis | 259/18 |
| 3,491,949 | 1/1970 | Hairston | 259/95 |
| 3,667,735 | 6/1972 | Hood | 259/95 |

Primary Examiner—Robert W. Jenkins
Attorney, Agent, or Firm—John N. Randolph

[57] ABSTRACT

An apparatus including a mixing tank connected to a source of water supply under pressure, by which the tank can be partially filled with water to be mixed with a poison in powder form, which is admitted to the tank through an access opening, normally closed by a transparent cover forming a window through which the mixing operation can be observed. Spray heads connected to the water supply source spray water across the top of the tank to settle dust from the poison powder, and a suction means communicating with the top part of the tank extracts poisonous fumes, caused by the powder, from the tank and discharges such fumes into a purifying unit from which purified air only is discharged. A pump connected to an outlet of the tank discharges the mixture under pressure to spray heads or other discharge means after first recirculating the mixture to complete the mixing operation.

8 Claims, 6 Drawing Figures

MIXING AND DISPENSING APPARATUS FOR POISON SPRAY

BACKGROUND OF THE INVENTION

This invention constitutes an improvement on the mixing and dispensing apparatus for poisonous spray as disclosed by U.S. Pat. No. 3,376,022 issued to Frederick M. Gleockler. Unlike the apparatus of the prior patent, the apparatus of this application provides a structure whereby the mixing of the powdered poison and water is accomplished entirely by the apparatus, thereby substantially eliminating all danger to an operator in accomplishing the mixing of the poisonous spray.

Summary

It is a primary object of the present invention to provide a mixing and dispensing apparatus for poisonous sprays whereby the mixing operation can be accomplished with the least possible risk of harm to the operator.

Another object of the invention is to provide an apparatus by means of which water under pressure can be admitted selectively in three ways to the mixing tank for initially partially filling the tank prior to adding the powdered poison thereto, and for thereafter spraying the upper portion of the tank for settling any dust from the poison and prior to extracting poisonous fumes from above the liquid level of the tank.

Another object of the invention is to provide a mixing and dispensing apparatus wherein the poison mixture may be recirculated for most effectively accomplishing the mixing operation, utilizing the same pump employed for dispensing the mixture to spray heads or other discharge devices.

Various other objects and advantages of the invention will hereinafter become more fully apparent from the following description of the drawings, illustrating a presently preferred embodiment thereof, and wherein:

DESCRIPTION OF THE PREFERRED EMBODIMENT

Figure 1:
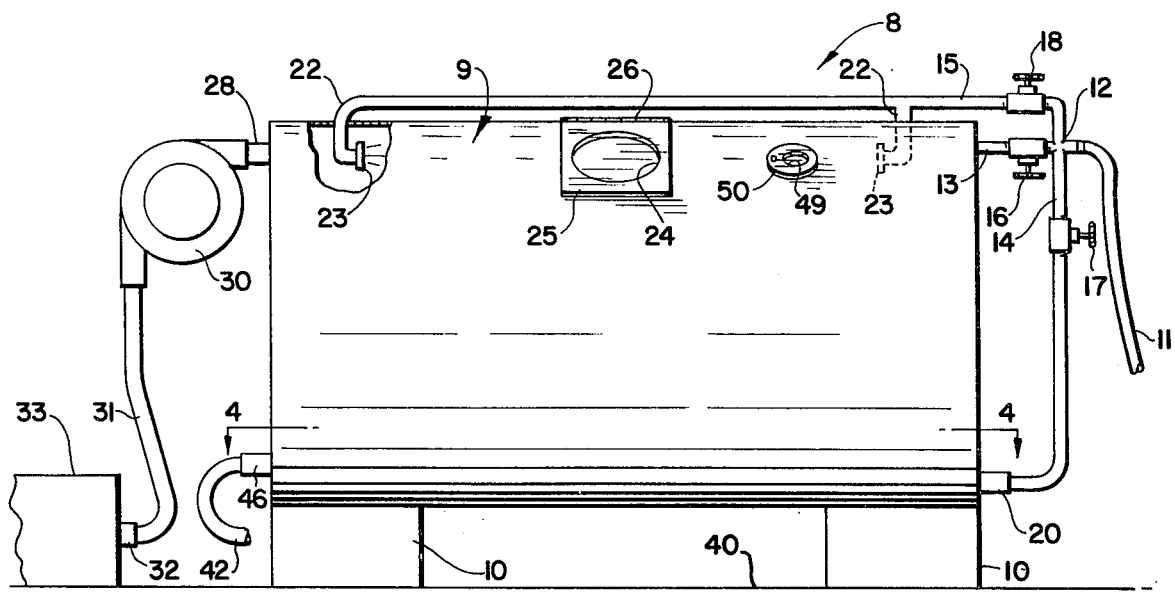
FIG. 1 is a side elevational view, partly broken away and partly in section, illustrating a portion of the mixing apparatus.
Figure 2:
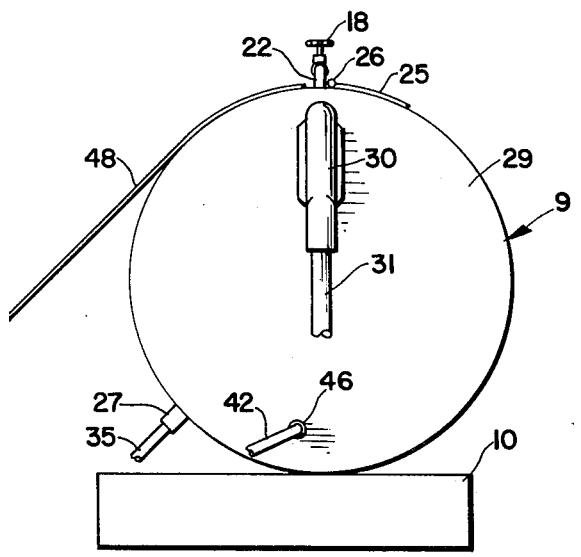
FIG. 2 is an end elevational view looking from left to right of FIG. 1.

Referring more specifically to the drawings, the mixing and dispensing apparatus for poisonous sprays is designated generally 8 and includes an elongated tank or container 9 of cylindrical cross section which is disposed with its longitudinal axis in substantially a horizontal plane and supported preferably by elongated blocks 10 on which end portions of the cylindrical wall of the tank 9 rest. A hose which leads from a source of water supply under pressure, not shown, connects with an inlet 12 of a conduit system having three branch conduits 13, 14 and 15 provided with shut-off valves 16, 17 and 18, respectively located adjacent the inlet 12.

Figure 4:
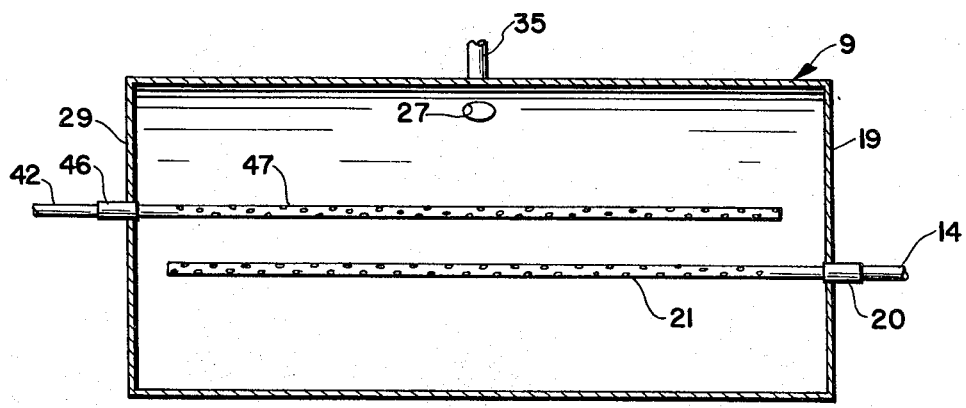
FIG. 4 is a fragmentary horizontal sectional view, taken substantially along a plane as indicated by the line 4—4 of FIG. 1.

The conduit 13 extends substantially in a straight line from the inlet 12 and discharges through an end wall 19 of the tank 9, adjacent the top of said tank. The branch 14 extends downwardly from the inlet 12 and connects with an enlarged end 20 of a perforated or apertured pipe 21, as seen in FIG. 4. The pipe 21 extends along the bottom portion of the tank 9 and its end 20 is secured in a liquid tight manner in the end wall 19 and has a liquid tight connection to the outlet end of the pipe 14. The pipe 15 extends upwardly from the inlet 12 and then along the top of the tank 9 and has two or more outlet portions 22 which extend downwardly into the top of the tank and terminate in spray heads 23 which are directed toward one another or toward the intermediate portion of the top of the tank.

Figure 3:
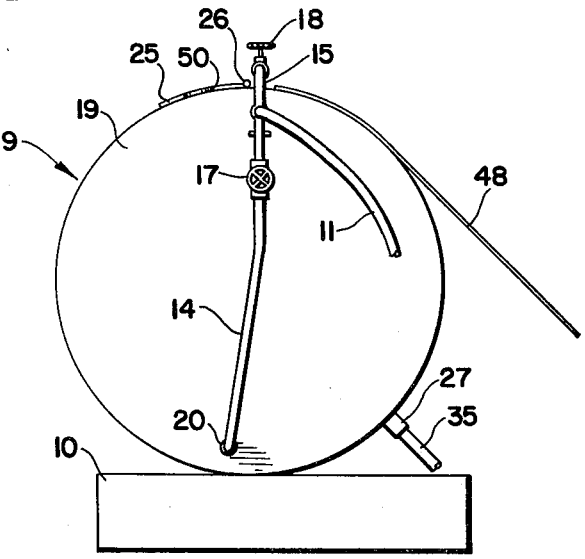
FIG. 3 is an end elevational view looking from right to left of FIG. 1.
Figure 5:
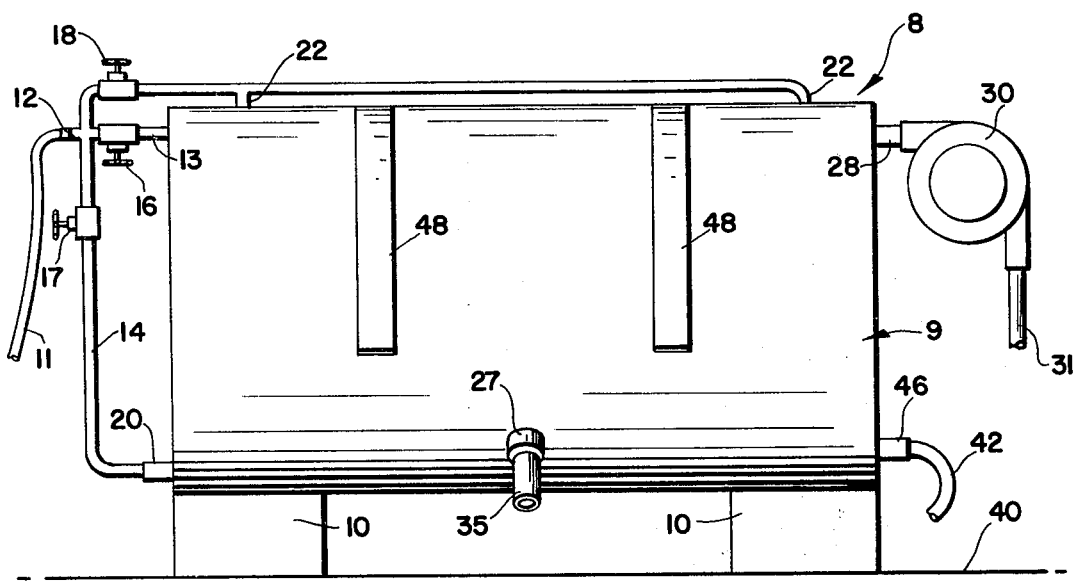
FIG. 5 is a fragmentary side elevational view looking toward the side of the apparatus opposite to the side thereof as seen in FIG. 1 and showing the apparatus in a mixing position.

The upper portion of the tank 9 is provided with an access opening 24 of substantial size which is normally closed by a transparent cover 25 which is hinged at 26 to a part of the exterior of the tank. An outlet port 27 extends through and is secured in the bottom portion of the cylindrical side wall of the tank 9, substantially midway of the ends of the tank, as seen in FIGS. 3, 5 and 6.

A short length of pipe 28 extends through and is secured in the other end wall 29 of the tank, near the top thereof, and is connected to the inlet of an electric blower 30 which is supported by said pipe 28. A hose 31 leads from the outlet of the blower 30 and connects with the inlet 32 of a hollow box or receptacle 33 which has a plurality of filter outlets 34.

Figure 6:
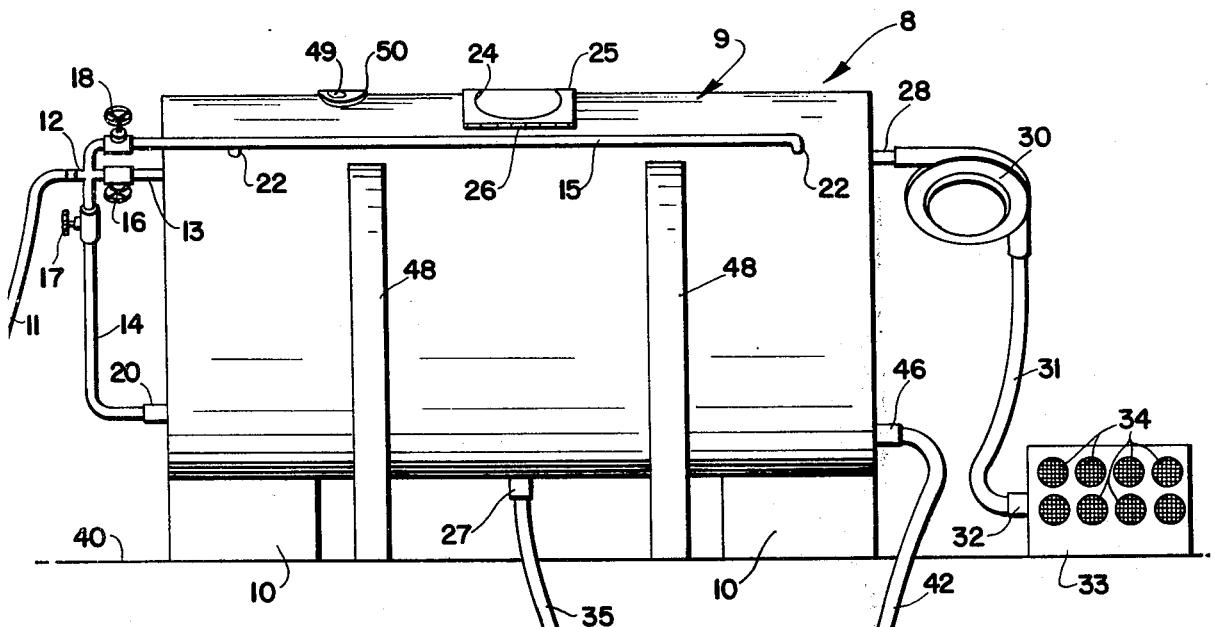
FIG. 6 is a side elevational view looking toward the same side of the apparatus as seen in FIG. 5 but showing the mixing tank rotated about its horizontal axis from a mixing to a dispensing position.
Figure 6:
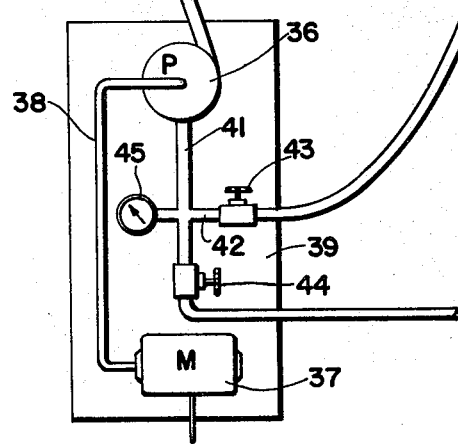

Referring to FIG. 6, a hose 35 connects the tank outlet 27 to the inlet of a pump 36. The pump 36 is driven by a motor 37 through a drive 38. The pump 36 and motor 37 are supported on a base 39 which may be disposed on the horizontal supporting surface 40 which supports the blocks 10.

A conduit 41 leads from the outlet of the pump 36 and has a branch 42 provided with a shut-off valve 43. The conduit 41, beyond the branch 42, has a shut-off valve 44 and said conduit 41 may be provided with a pressure gauge 45 between the pump 36 and valve 44. The conduit 41, beyond the valve 44, leads to a spray head or heads, or other discharge device, not shown. The branch conduit 42, beyond the valve 43, leads back to an inlet end 46 of an apertured pipe 47. The pipe 47 extends along the bottom portion of the tank 9, as seen in FIG. 4, and its inlet end 46 is secured in a liquid tight manner in the end wall 29.

One or more leg members 48 are carried by the tank 9. Each leg member 48 has an upper end which is secured to the cylindrical wall of the tank 9. Each leg 48 extends downwardly from its secured end and is located on the opposite side of the conduit 15 from the opening 24, as seen in FIG. 6.

FIGS. 1 to 5 illustrate the apparatus 8 in a position for mixing the poisonous spray and in which position the legs 48 are elevated, the pipes 21 and 47 are disposed in bottommost positions relative to the tank 9, and the conduits 15, 13 and 28 are disposed in uppermost positions. The valve 17 is opened to supply water under pressure to the tank 9 through the apertured conduit 21 to fill the tank to about one-half of its capacity. If a quick fill is desired, the valve 16 can also be opened to supply water to the top of the tank through the conduit 13. After the tank has been approximately half filled, the valve 17 or the valves 16 and 17 are closed. The cover 25 is opened and the powered poison is deposited into the tank 9 through the opening 24, after which the cover 25 is closed. The valve 18 is then opened so that water can be supplied under pressure through the conduit 15 to the spray head 23 for settling any dust from the poison powder.

In the position of the tank 9, as seen in FIGS. 1 to 5, the outlet 27 is elevated relative to the bottommost portion of the tank 9, but below the water level of the tank, to prevent the pump 36 from becoming clogged by the poison powder. The motor 37 and the blower 30 are then energized, with the valve 43 open and the valve 44 closed, so that the mixture in the tank 9 is circulated by the pump 36 through the hose 35, conduits 41 and 42 back to the tank 9 through the apertured pipe 47, for further mixing the water and powdered poison by this recirculation of the tank contents, while the blower 30 extracts any fumes from the powder from the upper portion of the tank 9, and discharges said fumes into receptacle 33, from which only the purified air can escape through the filter ports 34. During this recirculation and mixing of the tank contents, the valve 18 is opened for supplying additional fresh water through the spray nozzle 23 to mix any of the powder remaining on the surface of the liquid and to settle any dust from the powder which is not carried off by the blower 30.

During these operations, the cover 25 is closed to prevent any of the powder dust or fumes from escaping from the tank 9 through the opening 24. The operator can visually observe the mixing operation and determine when the powder has been adequately mixed with the fresh water by looking through the transparent cover 25.

When the mixing operation has been completed, the tank or mixing chamber 9 is rolled clockwise on the blocks 10, as seen in FIG. 3, to move the tank 9 from its position of FIG. 5 to its position of FIG. 6, with the legs 48 resting on the supporting surface 10, or said legs could be located so as to come to rest on portions of the blocks 10, if said blocks are of sufficient length. The valve 43 is closed and the valve 44 is opened so that the mixture under pressure will be dispensed to the spray heads or other discharge devices through the line 41. During the dispensing operation additional water under pressure can be supplied to the mixing chamber 9 from the line 11 by opening the valve 17 or the valve 18, depending upon whether it is desirable to supply the water to the bottom or to the top, respectively, of the tank 9. A vent port 49 is provided in the upper portion of the cylindrical wall of the tank 9 and is normally closed by a pivoted cover 50, which can be opened for venting the tank, during the dispensing operation. The cover 50 likewise may be made transparent.

Various modifications and changes are contemplated and may be resorted to, without departing from the function or scope of the invention.

We claim as our invention:

1. An apparatus for mixing and dispensing poisonous spray comprising a container, a conduit system connected to a source of water supply under pressure and having outlets discharging into top and bottom portions of the container, means for selectively controlling discharge of the water from said outlets, an access opening in the top portion of said container for supplying the container with a poison in powder form, a closure for said opening, a discharge conduit leading from said container, a pump for forcing the mixture under pressure through said discharge conduit from the container, a branch conduit leading from said discharge conduit, beyond said pump, and discharging back into the bottom portion of the container, and valve means for controlling the flow of the mixture either through said branch conduit or to the outlet end of the discharge conduit.

2. An apparatus as in claim 1, one of the outlets of the conduit system comprising spray heads discharging into the top of the container for moistening and settling dust from the powdered poison.

3. An apparatus as in claim 2, a blower having an inlet communicating with the upper portion of the interior of the container, and a purifying device communicating with the outlet of the blower for receiving poisonous fumes from the container and for discharging purified air to the atmosphere.

4. An apparatus as in claim 1, one of said outlets of the conduit system comprising an apertured conduit extending along the interior of the container near its bottom.

5. An apparatus as in claim 1, means for turnably adjusting the container about a horizontal axis thereof for moving the discharge conduit from a slightly elevated position relative to the bottommost portion of the container, constituting a mixing position, to a bottommost position relative to the container, constituting a dispensing position.

6. An apparatus as in claim 1, and an apertured conduit extending along the bottom portion of the interior of the container and constituting the discharge end of the branch conduit.

7. An apparatus as in claim 1, said cover being transparent to provide an observation window.

8. An apparatus as in claim 1, a vent port in the upper portion of said container, and a cover for closing said vent port.

* * * * *